United States Patent [19]

Cassity et al.

[11] Patent Number: 4,791,987
[45] Date of Patent: Dec. 20, 1988

[54] WELLHEAD SEAL

[75] Inventors: Thomas G. Cassity, Katy; Steven D. Gullion, Houston, both of Tex.

[73] Assignee: Cameron Iron Works USA, Inc., Houston, Tex.

[21] Appl. No.: 44,410

[22] Filed: Apr. 30, 1987

[51] Int. Cl.$^4$ ............................................. E21B 33/04
[52] U.S. Cl. ..................... 166/85; 166/115; 166/182; 166/208; 166/217; 277/116.6; 277/116.8; 277/118; 277/236; 285/146
[58] Field of Search ............... 166/182, 195, 179, 217, 166/206–208, 115, 88, 85, 348, 382; 277/236, 117, 118, 115, 214, 116.2, 116.4, 116.6, 116.8, 190; 285/382.5, 382.4, 382.2, 382.1, 382, 139, 315, 140–143, 146

[56]         References Cited
        U.S. PATENT DOCUMENTS

| | | | |
|---|---|---|---|
| 1,683,640 | 9/1928 | Weise | 277/116.6 |
| 2,953,406 | 9/1960 | Young | 166/217 X |
| 3,719,375 | 3/1973 | Nordin | 285/339 |
| 4,131,287 | 12/1978 | Gunderson et al. | 277/191 |
| 4,178,020 | 12/1979 | Dopyera | 277/190 |
| 4,573,537 | 3/1986 | Hirasuna et al. | 166/134 X |
| 4,595,053 | 6/1986 | Watkins et al. | 166/209 |
| 4,650,225 | 3/1987 | Le et al. | 285/351 X |
| 4,665,979 | 5/1987 | Boehm, Jr. | 166/208 |
| 4,6476,845 | 3/1987 | Boeker | 166/387 |

FOREIGN PATENT DOCUMENTS 620892  11/1962  Belgium ............................. 277/236

Primary Examiner—Hoang C. Dang
Attorney, Agent, or Firm—Vinson & Elkins

[57]           ABSTRACT

An improved wellhead seal for sealing across the annular space between the exterior of a hanger and the interior of a wellhead housing having a seal ring with upper and lower rims, resilient metal lips on the interior of said lower rim for engaging the exterior of the hanger and gripping and sealing elements on the exterior of the upper rim and multiple camming surfaces on the interior of the upper rim and an actuating ring having multiple camming surfaces mating with the multiple camming surfaces on the upper rim so that downward movement of said actuating ring cams the gripping and sealing elements on said upper rim into tight metal-to-metal sealing engagement with the housing interior sealing surface. The sealing may be accomplished directly between the exterior of a hanger rim or by a seal ring positioned between the hanger rim and the interior housing surface.

11 Claims, 5 Drawing Sheets

WELLHEAD SEAL

BACKGROUND

Wellhead seals are used to seal across the annular space between the exterior of a hanger and the interior of a wellhead housing in which the hanger is supported. Many types of seals have been used in the past. Such seals have included resilient annular members which are positioned within the annular space and compressed axially to expand them into sealing engagement with the surfaces defining the interior and exterior of the annular space, such as disclosed in U.S. Pat. No. 3,797,864.

Other seals include metal members having lips urged into engagement with the inner and outer sealing surfaces as shown in U.S. Pat. Nos. 2,405,152; 2,746,486; 4,131,287; and 4,178,020.

Some seals have utilized a combination of resilient and metal seals such as illustrated by U.S. Pat. Nos. 4,488,740 and 4,550,782.

Additionally seals have been provided which utilize a resilient or metal seal which is mechanically wedged or cammed into sealing engagement with the walls of the annular space in a well bore. Other seal structures have included threaded or roughened sealing surfaces, such as wickers, which provide a positive metal-to-metal seal. U.S. Pat. No. 4,595,053 is an example of these two types of seals.

SUMMARY

The present invention provides an improved wellhead seal for sealing across the annular space between the exterior of a hanger and the interior of a wellhead housing having a seal ring with upper and lower rims, the lower rim having resilient metal lips for engaging the exterior of the hanger and the upper rim having external gripping and sealing teeth or serrations and an actuating ring whereby downward movement of the actuating ring moves the upper rim outward to force its gripping and sealing teeth into tight sealing engagement with the interior of the wellhead housing.

An object of the present invention is to provide an improved annular wellhead seal for sealing across the annular space between two tubular well members which ensures tight sealing engagement with its sealing surfaces.

Another object is to provide an improved annular wellhead seal with improved metal-to-metal seals against both the interior and exterior of the annulus.

A further object is to provide an improved annular wellhead seal in which the interior and exterior seals are of different types and function independently of each other.

Still another object is to provide an improved annular wellhead metal seal which will tolerate vertical and radial movement between the members which are to be sealed with respect to one another.

A still further object is to provide an improved annular wellhead metal seal which will support axial forces imposed by the subsequent casing and testing loads developed from subsequently set hangers.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
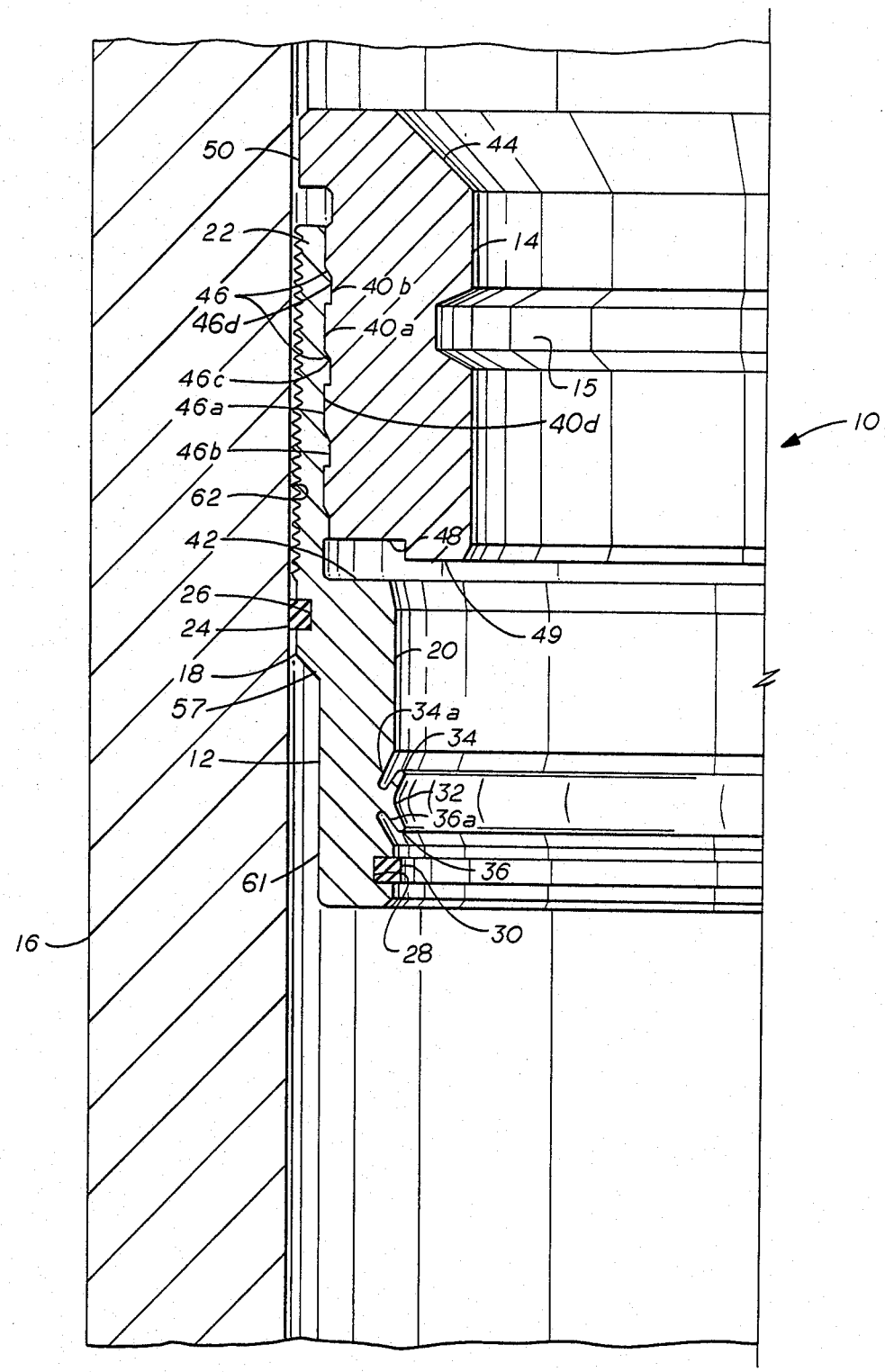
FIG. 1 is a partial sectional view of the improved annular wellhead seal as it is being run into a wellhead for subsequent landing within the annular space across which it is to seal.

Improved seal assembly 10 of the present invention is shown in its running position in FIG. 1. Seal assembly 10 includes seal ring 12 and actuating ring 14. As shown in FIG. 1, seal assembly 10 is positioned within wellhead member 16 and is being lowered therein on a suitable running tool (not shown). Seal ring 12 includes annular body 18 having lower rim 20 extending downward from the inner portion of body 18 and upper rim 22 extending upward from the outer portion of body 18. Wiper 24 is positioned within groove 26 around the exterior of body 18 and is sufficiently large to engage the interior of wellhead member 16 as seal assembly 10 is being lowered therein.

Lower rim 20 includes groove 28 on the lower portion of its interior surface with wiper 30 being positioned therein and being sufficiently large to wipe the outer sealing surface of the hanger against which seal assembly 10 is to seal. Spaced above groove 28 is seal area 32 having sealing lips 34 and 36. Both of lips 34 and 36 extend inwardly with upper lip 34 extending upwardly and inwardly and lower lip 36 extending downwardly and inwardly. The inner diameter of lips 34 and 36 is sufficiently small to ensure proper sealing against the exterior of the hanger against which seal assembly 10 is to seal. Upper rim 22 includes external teeth or gripping and sealing elements or serrations 38 and internal multiple upward facing camming surfaces 40. Serrations 38 are intended to include small parallel grooves with pointed projections between the grooves. The inner edges of camming surfaces 40 terminate at flat cylindrical surfaces 40a and the outer edges of camming surfaces 40 terminate at flat cylindrical surfaces 40b so that camming surfaces 40 and cylindrical surfaces 40a and 40b form a toothed profile 40c with recesses 40d. Upper rim 22 extending upwardly from the outer portion of annular body 18 provides shoulder 42 on the upper part of body 18 within rim 22.

Actuating ring 14 is annular in shape and includes inner tapered landing seat 44 on which a subsequent well member could be landed, external multiple downward facing camming surfaces 46 which mate with the camming surfaces 40 on the interior of upper rim 22. The outer edges of camming surfaces 46 terminate at flat cylindrical surfaces 46a and the inner edges of camming surfaces 46 terminate at flat cylindrical surfaces 46b so that camming surfaces 46 and cylindrical surfaces 46a and 46b form a toothed profile 46c with recesses 46d. In running position, actuating ring 14 is in its upper position, as shown in FIG. 1, and in such position its lower surface 48 is spaced above shoulder 42 o body 18 and camming surfaces 40 and 46 are in contact.

Toothed profiles 40c of upper rim 22 are located in recesses 46d of actuating ring 14 and toothed profiles 46c of actuating ring 14 are located in recesses 40d of upper rim 22 so that toothed profiles 40c and 46c are interlocked. This spacing between surfaces 42 and 48 should be sufficient to allow full travel of actuating ring 14 in its downward setting movement as hereinafter described. Actuating ring 14 includes an outwardly extending flange 50 at its upper end above surfaces 46 and the lower surface of flange 50 is also spaced above the upper end of upper rim 22 by a sufficient distance to allow full setting movement of actuating ring 14. Actuating ring 14 also includes preparation for receiving the suitable running tool (not shown).

Figure 2:
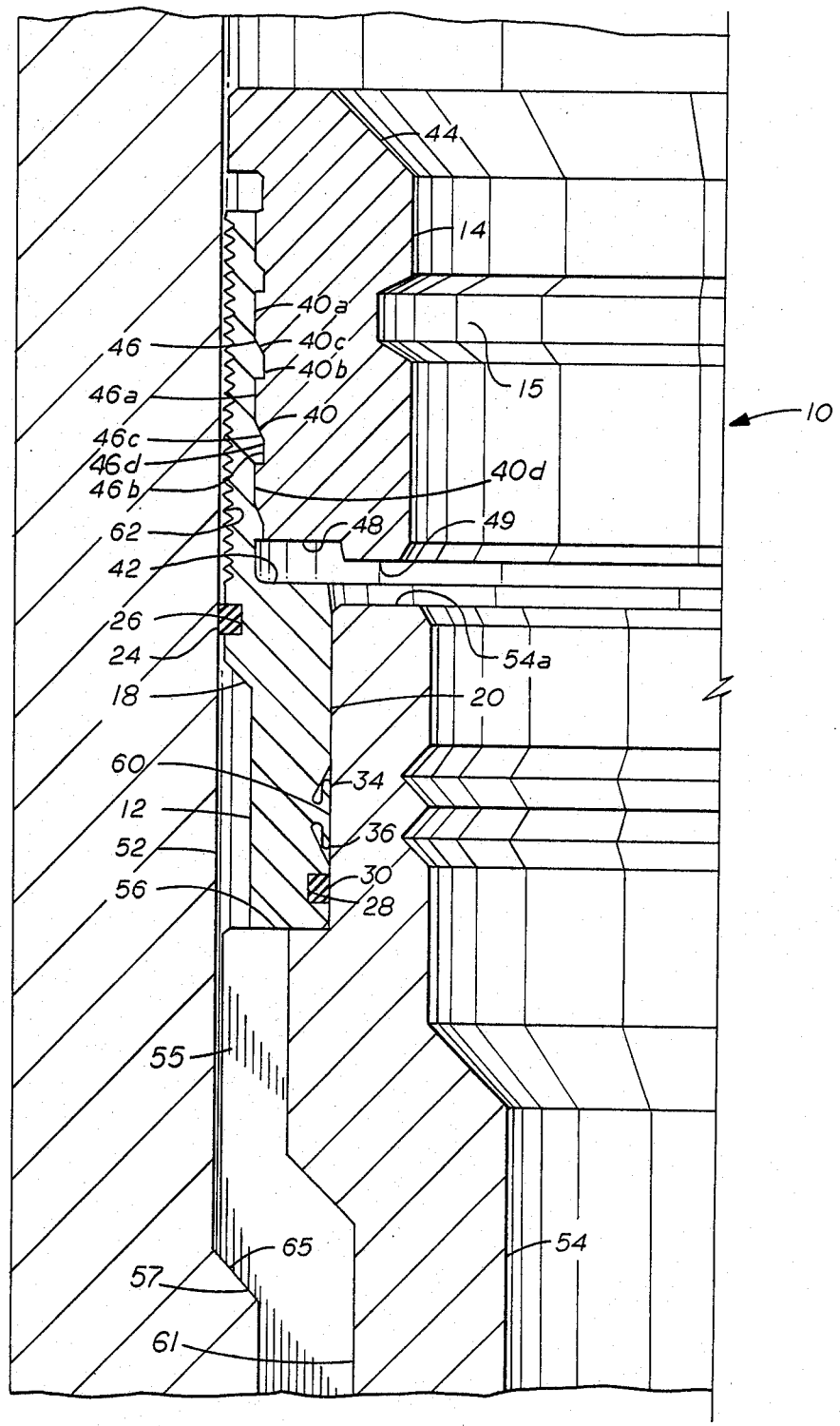
FIG. 2 is another partial sectional view of the improved wellhead sea after it has been landed and prior to energization.

As shown in FIG. 2, sealing assembly 10 is landed in annular space 52 between the interior of wellhead member 16 and the exterior of hanger 54 above upwardly facing shoulder 56 of hanger 54. Hanger 54 is landed upon in wellhead member 16 with downwardly facing shoulder 57 of hanger 54 being in supporting contact with upwardly facing shoulder 58 of wellhead member 16 and includes the usual mud slots 55 which allow circulation of cement or other well fluids prior to the landing of seal assembly 10 in annular space 52. With seal assembly 10 landed in annular space 52 as shown in FIG. 2 the lower end of lower rim 20 is in engagement with shoulder 56 on hanger 54. In this position, wiper 30 in its downward movement has wiped external sealing surface 60 of hanger 54 free of trash, mud and all other materials which would interfere with proper sealing of lips 34 and 36 against sealing surface 60. Also, wiper 24 has wiped interior sealing surface 62 of wellhead member or housing 16 free of trash, mud and all other materials which would interfere with proper sealing of gripping teeth 38 to sealing surface 62.

Figure 3:
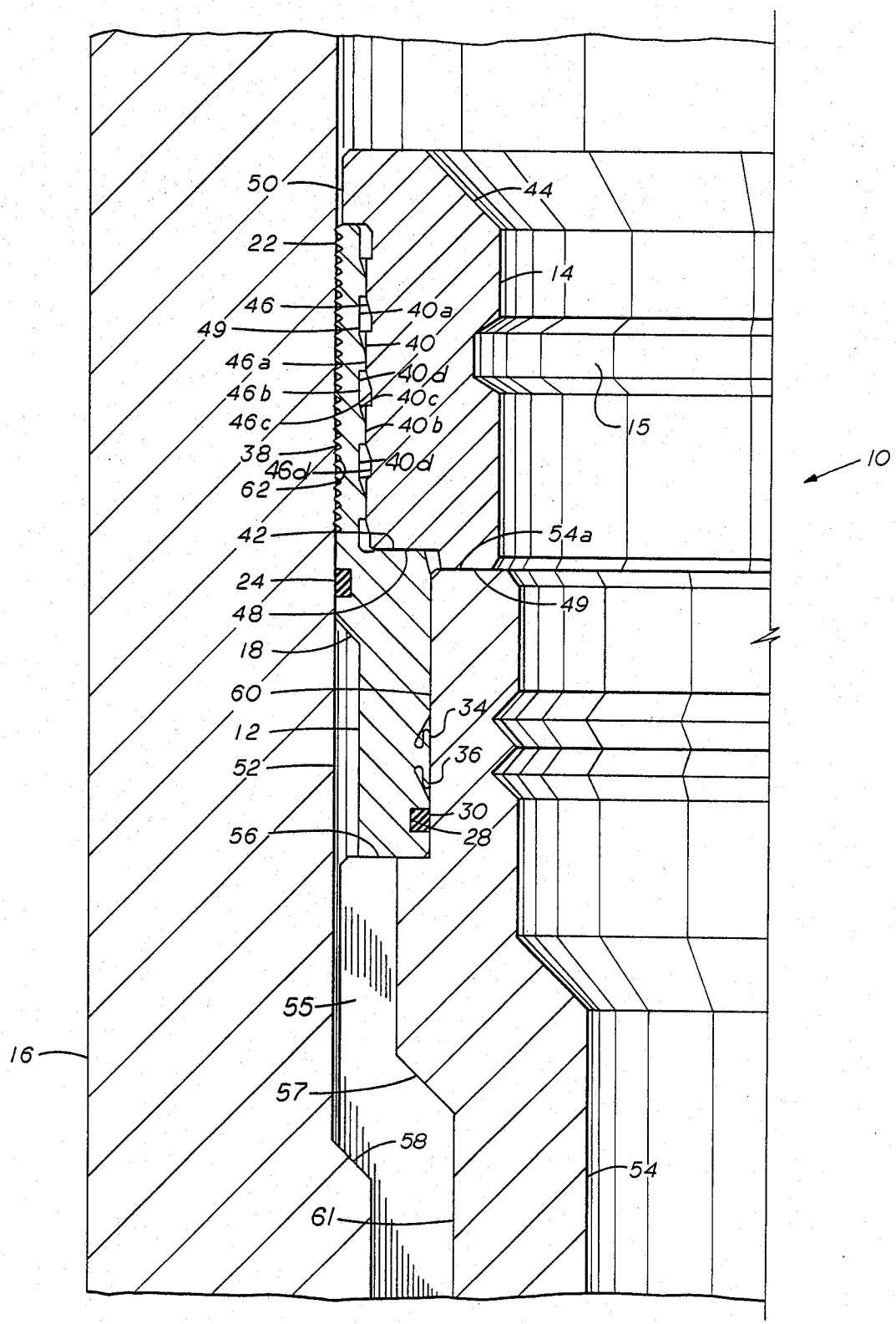
FIG. 3 is another partial sectional view of the improved wellhead seal after it has been moved into tight sealing engagement across the annular space.

With seal assembly 10 in the position shown in FIG. 2, it is ready for the engagement of gripping teeth 38 of upper rim 22 with sealing surface 62 of wellhead member 16. Actuating ring 14 is moved downward by a suitable tool (not shown) so that its exterior camming surfaces 46 move downward on camming surfaces 40 of upper rim 22 to wedge gripping teeth 38 into tight gripping and sealing engagement with sealing surface 62. In this position as shown in FIG. 3, actuating ring 14 has moved to its lower position with its lower surface 48 engaging shoulder 42 on the upper portion of seal body 18 and also with the lower surface of flange 50 in engagement with the upper surface of rim 22. These two engagements between actuating ring 14 and seal ring 12 provide suitable stops for the downward movement of actuating ring 14 at a position when maximum force has been exerted on upper rim 22 to ensure positive deformation of sealing surface 62 by gripping teeth 38. Also, lower inner surface 49 of actuator 14 engages upper surface 54a of hanger 54. These engagements provide a transfer of the load of a hanger which is subsequently landed on landing seat 44. This load is then transferred through actuating ring 14 and rim 22 into housing 16, through actuating ring 14, shoulders 42 and 48, hanger 54 and seat 58 into housing 16 and through actuating ring 14, shoulder 54a and seat 58 into housing 16. Cylindrical surfaces 46a of actuating ring 14 have also been moved downward to become in tight contact with cylindrical surfaces 40b of upper rim 22 and thereby eliminate any tendency of actuating ring 14 to move upward in relation to seal ring 12. Also, sealing by lips 34 and 36 against sealing surface 60 is complete and is enhanced by the configuration of the lips. Fluid pressure from the interior of hanger 54 acts on exterior surface 34a of upper lip 34 to urge lip 34 into tight sealing engagement with surface 60 of hanger 54. In a similar manner fluid pressure from the exterior of hanger 54 acts on exterior surface 36a of lower lip 36 to urge lip 36 into tight engagement with surface 60 of hanger 54. Such pressure urging of lips 34 and 36 towards surface 60 increases as the pressure increases. As can be seen in FIG. 1, lips 34 and 36 protrude inward from surface 20 and as such are able to compensate for eccentricity between wellhead member 16 and hanger 54 and still sealingly engage surface 60.

It should be noted that the exterior surface 61 of lower rim 20 is spaced substantially from the interior surface 62 of wellhead housing 16. This provides a space for the trash and mud which is wiped from surface 62 by wiper 24 so that such trash and mud cannot interfere with the sealing operations of seal assembly 10.

Sealing assembly 10 is retrievable from its sealing position in annular space 52 by lifting actuating ring 14 with a suitable well tool (not shown) which can engage running tool preparation, such as groove 15. Lifting of actuating ring 14 moves its camming surfaces 46 upwardly to release the force exerted on upper rim 22. When actuating ring 14 reaches its upper position as shown in FIGS. 1 and 2, the toothed profiles on actuating ring 14 and upper rim 22 again become interlocked to transmit the lifting force to seal ring 12. This upward force is sufficient to cause a release of the gripping engagement of gripping teeth 38 with sealing surface 62 to allow completion of the retrieval of seal assembly 10.

Sometimes well debris, such as gravel or clay, becomes deposited on upwardly facing shoulder 58 of wellhead member 16 and prevents downwardly facing shoulder 57 of hanger 54 from contacting shoulder 58. Pressure subsequently present in the interior of hanger 54 may crush the debris and cause hanger 54 to move downward relative to wellhead member 16 and sealing assembly 10. Since sealing lips 34 and 36 are not firmly locked to hanger seal surface 60, such relative vertical movement between the sealing lips and surface 60 does not compromise the sealing engagement of the lips 34 and 36.

It should be recognized in the preferred embodiment of FIGS. 1, 2 and 3 that the Brinell hardness of seal assembly 10 in the area of serrations 38 is preferably greater than the Brinell hardness of surface 62 of wellhead member 16 so that serrations 38 will bite into surface 62 when actuating ring 14 is moved downward. In some situations it may be preferable to place serrations at the appropriate location on surface 62 rather than on seal assembly 10. In such a situation it would be preferable to have the serration area of the wellhead member a higher Brinell hardness than the smooth exterior surface of the seal assembly.

Figure 4:
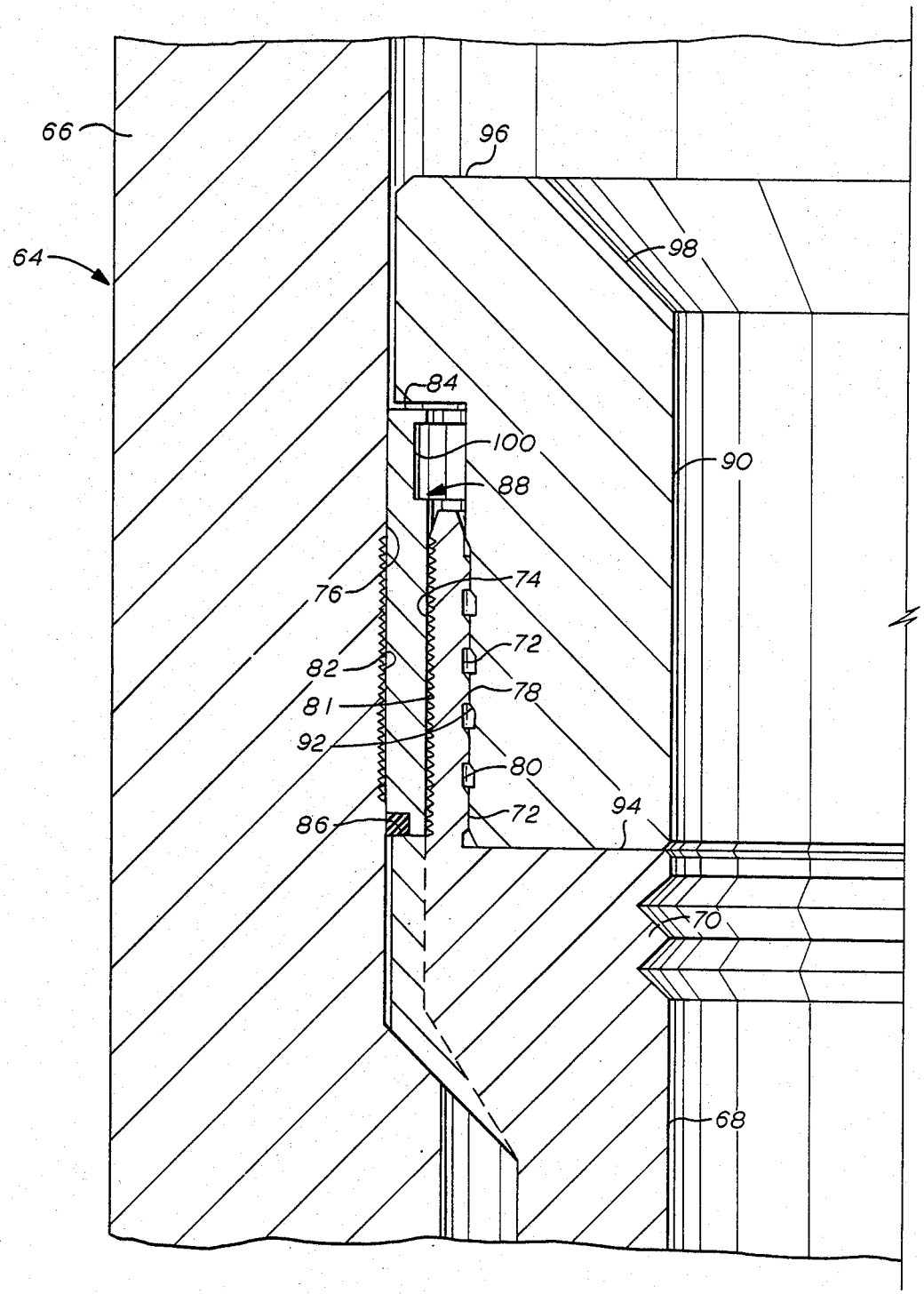
FIG. 4 is a partial sectional view of a modified form of the improved annular wellhead seal of the present invention.

Annular wellhead seal assembly 64 shown in FIG. 4 is a modified form of the improved seal of the present invention. Seal assembly 64 is provided to seal between wellhead housing 66 and hanger 68 which has been landed therein. Hanger 68 includes body 70 with upstanding rim 72, the outer surface 74 of rim 72 being spaced inward from inner surface 76 of housing 66. The inner surface 78 of rim 72 includes multiple upward facing camming surfaces 80 and outer surface 74 includes serrations 81. Inner surface 76 of housing 66 has a plurality of serrations 82 therein as shown. Seal ring 84 is positioned within annulus 88 between inner surface 76 of housing 66 and outer surface 74 of rim 72 and has its lower end in engagement with upwardly facing shoulder 86 of hanger 68 at the lower end of annulus 88. Seal assembly 64 includes seal ring 84 and actuating ring 90 which coact together with rim 72 to complete the sealing across annulus 88. Actuating ring 90 includes multiple downward facing camming surfaces 92 which mate and coact with camming surfaces 80 as previously described with respect to seal assembly 10.

Seal assembly 64 is shown in FIG. 4 in its set position with actuating ring 90 moved downward to engage interior shoulder 94 on hanger 68 within rim 72. With actuating ring 90 in this position the camming action has been completed and the actuating ring 90 and rim 72 have their outer and inner cylindrical surfaces in engagement to retain rim 72 in its position of gripping engagement of its serrations 81 with the interior surface of seal ring 84 and also forcing seal ring 84 outwardly so that its exterior surface is in tight gripping and sealing engagement with serrations 82 on interior surface 76 of housing 66. Actuating ring 90 includes flat upper surface 96 against which a suitable setting tool may exert a downward load to move actuating ring 90 downward into set position. Tapered surface 98 extends downward and inward from the inner portion of flat surface 96 and can be used as a landing seat for well structures which are to be subsequently landed within housing 66. If retrieval of actuating ring 90 is desired, a suitable interior profile for engagement by a retrieval tool would be provided on the interior of actuating ring 90. Also, groove 100 on the upper interior of seal ring 84 could be engaged by a suitable retrieval tool for the retrieval of seal ring 84 after actuating ring 90 has been raised above groove 100.

It should be noted that in most wellhead sealing situations, the condition of the sealing surface on the exterior of the hanger is known to be satisfactory while the condition of the sealing surface of the interior of the wellhead housing is unpredictable. The present invention provides an improved metal-to-metal seal against both such surfaces.

Figure 5:
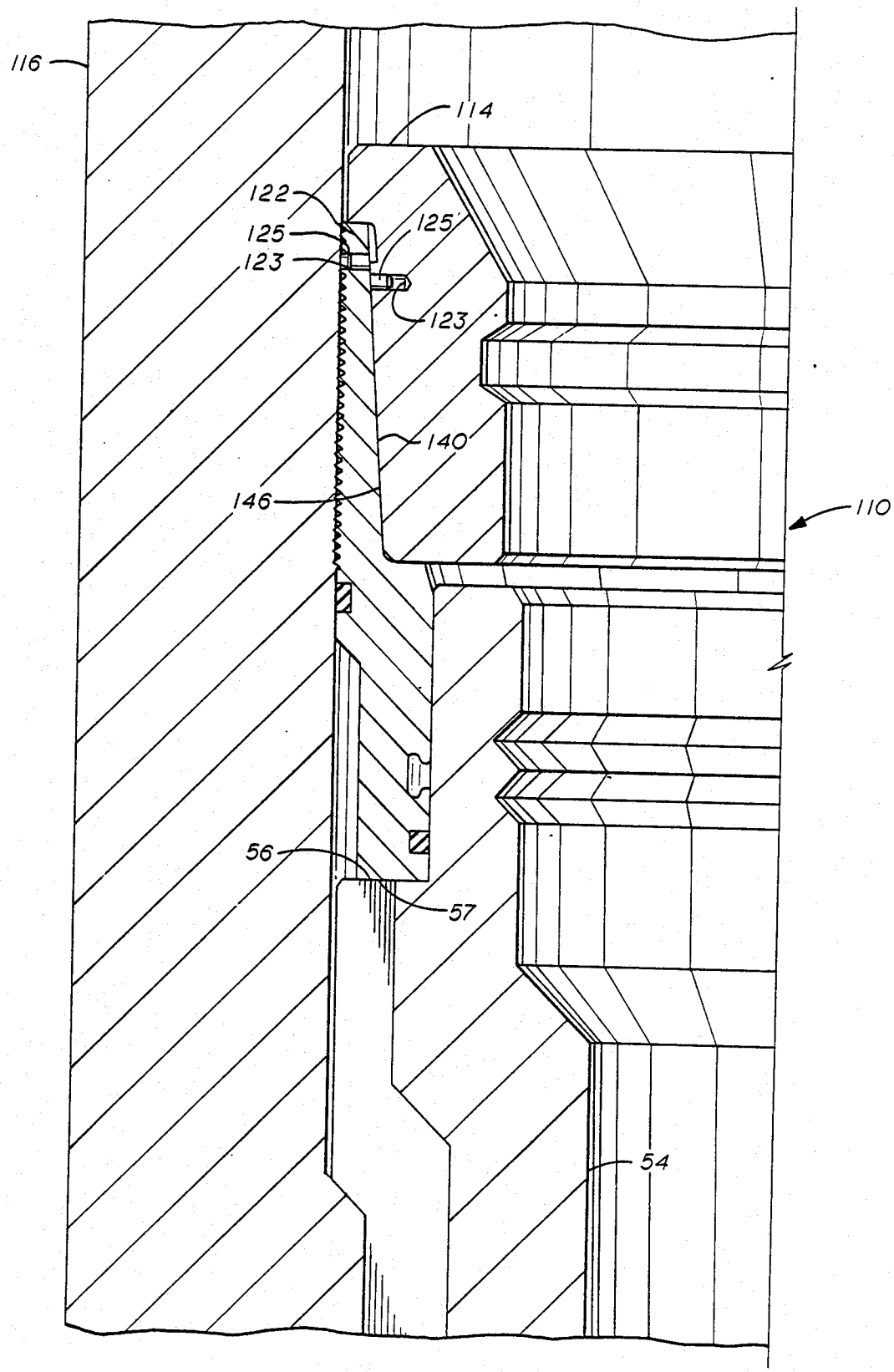
FIG. 5 is a partial sectional view of a modified form of the improved annular wellhead seal.

Another modified form of the present invention is shown in FIG. 5 wherein seal assembly 110 is energized by exterior tapered surface 146 of actuating ring 114 engaging interior tapered surface 140 of upper rim 122 to urge upper rim 122 into sealing engagement with the interior surface of wellhead member 116. Shear pin 123 is inserted in hole 125 through rim 122 and into energizing ring 114 to retain seal assembly 110 in an unenergized position until shoulder 57 engages upwardly facing shoulder 56 of wellhead member 116.

What is claimed is:

1. An annular wellhead seal comprising
    a seal ring having a central body with an inner upwardly facing shoulder, an upper outer rim extending above central body and a lower rim extending below the central body, said central body having a central bore, said shoulder defining an annular surface intersecting the outer rim at an angle and extending substantially from the outer rim to the central bore of the central body,
    said upper rim having external projections providing a gripping surface and an internal tapered camming surface,
    said lower rim having internal flexible metal sealing means, and
    an actuating ring position within said upper rim and having an external tapered camming surface mating with the internal tapered camming surface of said upper rim, the tapered camming surfaces being positioned so that downward movement of said actuating ring forces said upper rim outwardly to cause said external gripping surface projections to engage an inner sealing surface surrounding said upper rim in tight gripping engagement.

2. An annular wellhead seal according to claim 1 including
    a wiper carried by said seal ring on its exterior below said upper rim for wiping trash, mud and other materials from the sealing surface against which said upper rim external gripping surface is to seal.

3. An annular wellhead seal according to claim 1 including
    a wiper carried by said lower rim below its sealing means for wiping trash, mud and other materials from a sealing surface against which said lower rim flexible metal sealing means is to seal.

4. An annular wellhead seal according to claim 1 wherein said sealing means on said lower rim includes
    an upper metal sealing lip extends upwardly and inwardly, and
    a lower metal sealing lip extends downwardly and inwardly.

5. An annular wellhead seal according to claim 1 including
    said upwardly facing shoulder being a means limiting the downward travel of said actuating ring when it has reached the end of the camming surfaces.

6. An annular wellhead seal according to claim 20 wherein said camming surfaces on said upper rim and said actuating ring include multiple mating camming surfaces.

7. An annular wellhead seal according to claim 6 wherein
    said camming surfaces on said upper rim and said actuating ring having tooth profiles which on reverse movement of said ring become interlocked to transmit the upward lifting forces to the seal ring for retrieval.

8. An annular wellhead seal comprising
    a seal ring having a central body with an upwardly facing shoulder, an upper rim extending above the central body, a lower rim extending below the central body, said central body having a central bore, said shoulder defining an annular surface intersecting the outer rim at an angle and extending substantially from the outer rim to the central bore of the central body,
    said upper rim having external projections providing a gripping and sealing surface and multiple internal tapered camming surfaces,
    said lower rim having internal flexible metal sealing means,
    a structure surrounding seal ring, and
    an actuating ring positioned within said upper rim and having multiple external camming surfaces mating with said multiple internal camming surfaces of said upper rim, the camming surfaces on said actuating ring and said upper rim being positioned so that downward movement of said actuating ring forces said upper rim outwardly to cause said external gripping sealing surface projections to engage a surface on said structure facing and immediately surrounding the exterior of said upper rim in tight gripping and sealing engagement.

9. An annular wellhead seal according to claim 8 wherein the surface immediately surrounding the exterior of said upper rim is a cylindrical surface immediately surrounding the exterior of said central body.

10. An annular wellhead seal according to claim 8 wherein
the surface immediately surrounding the exterior of said upper rim is a tubular sealing ring.

11. An annular wellhead seal according to claim 10 wherein
said central body includes an upwardly facing shoulder outward of the upper rim, and
said tubular sealing ring has its lower end supported on said outer central body shoulder.

* * * * *